April 28, 1970   J. N. EWALD, JR., ET AL   3,508,680
DEVICE FOR METERING AND DISPENSING MATERIALS
Filed June 3, 1968                          2 Sheets-Sheet 1

INVENTORS
JOHN N. EWALD JR.
DONALD A. SCHULDT
BY JAMES H. CASEY
Burd, MacEachron, Braddock,
Bartz & Schwartz
ATTORNEYS

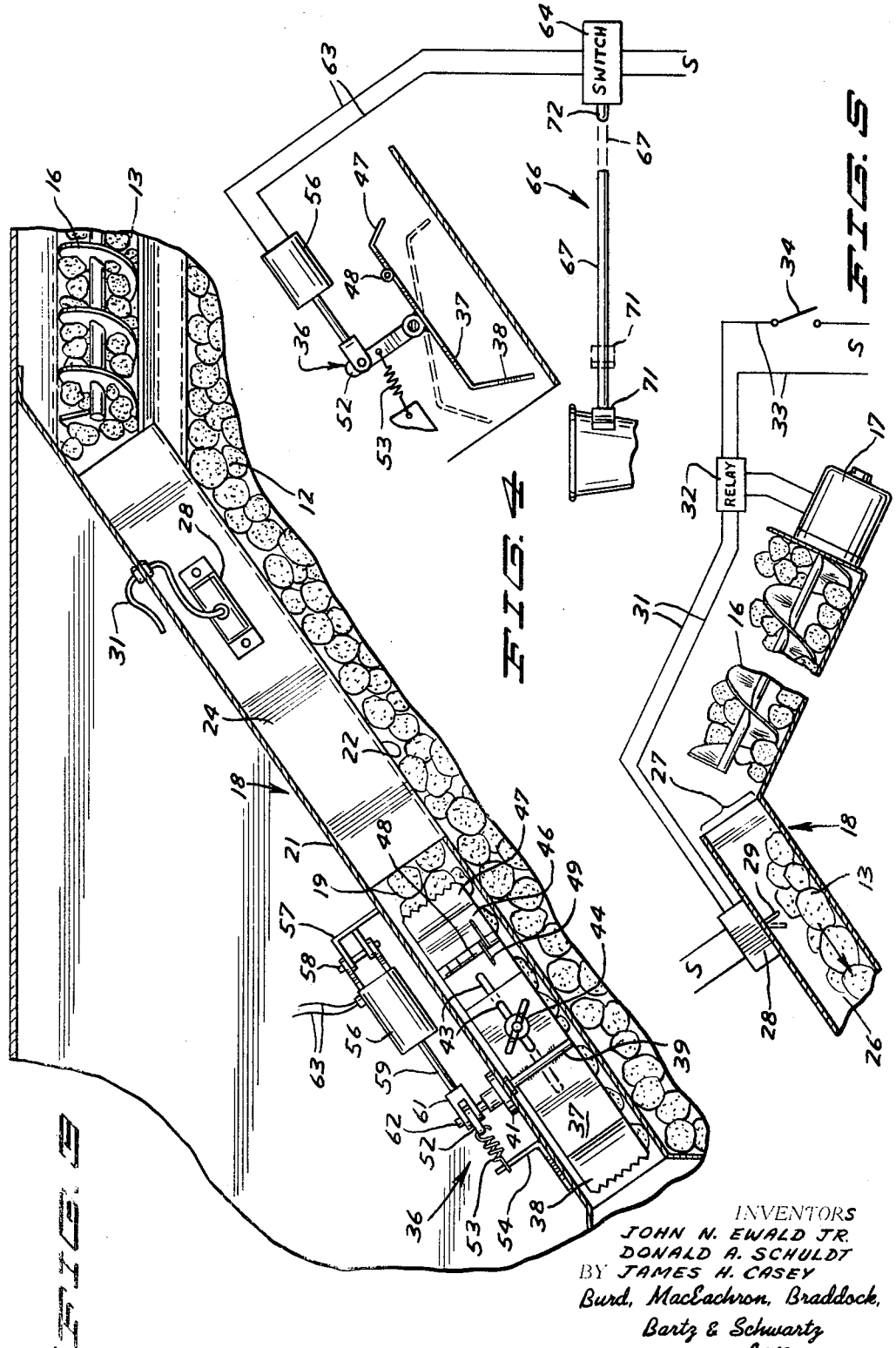

United States Patent Office 3,508,680
Patented Apr. 28, 1970

3,508,680
DEVICE FOR METERING AND DISPENSING
MATERIALS
John N. Ewald, Jr., Rte. 3, Box 242A, Litchfield, Minn. 55355, and Donald A. Schuldt and James H. Casey, St. Paul, Minn.; said Schuldt and said Casey assignors to said Ewald
Filed June 3, 1968, Ser. No. 742,470
Int. Cl. B65g 59/00
U.S. Cl. 221—258                                                    14 Claims

ABSTRACT OF THE DISCLOSURE

An apparatus for discharging a quantity of material into a container. The apparatus has a downwardly inclined trough providing a passageway for dispensable material. A motor driven auger operates to move material into the top of the trough. Pivotally mounted on the lower portion of the trough is a gate operable to hold the material in the trough. A solenoid moves the gate to a position whereby a portion of the material in the trough is discharged from the trough. The upper portion of the trough is closed forming a tunnel through which the material moves toward the gate. A switch having an actuator extended into the tunnel is operable to control the operation of the auger motor in response to the amount of material in the tunnel.

BACKGROUND OF INVENTION

Apparatus and methods for dispensing material, as ice cubes, into a drinking glass have been developed to provide a convenient and readily available charge of ice cubes. U.S. Patent No. 3,341,065 is an example of an ice cube dispenser operable to discharge a quantity of ice into a drinking glass. The device for metering and dispensing materials of this invention is an improvement of the dispensing apparatus shown in Patent No. 3,341,065.

SUMMARY OF INVENTION

The invention is directed to an apparatus operable to automatically dispense individual servings of particulate material, as ice cubes, into a receiver or a drink glass. More particularly, the invention relates to a dispensing apparatus having a downwardly inclined trough and gate means located in the trough for measuring and controlling the movement of material through the trough. A portion of the trough above the gate means is enclosed to form a tunnel-like passageway for receiving material from a conveyor driven by a motor. A switch having an actuator extended into the tunnel-like passageway and engageable with the material in the pasageway operates a motor used to drive an auger operable to feed additional material into the tunnel-like passageway. The gate means measures the amount or charge of material to be dispensed. The gate means is movably mounted in the trough for selected movement to a closed position and an open position. A solenoid connected to the gate means is actuated in response to movement of a receiver under the discharge portion of the trough so that when the material receiver is located below the discharge end of the trough the solenoid opens the gate means allowing the material to fall into the receiver.

IN THE DRAWINGS

FIGURE 3 is an enlarged sectional view taken along the line 3—3 of FIGURE 1;

FIGURE 4 is a diagrammatic view of the electrical and mechanical control system for the dispensing assembly; and FIGURE 5 is a diagrammatic view of the electrical control for the auger operable to feed the material into the discharge trough.

Figure 1:
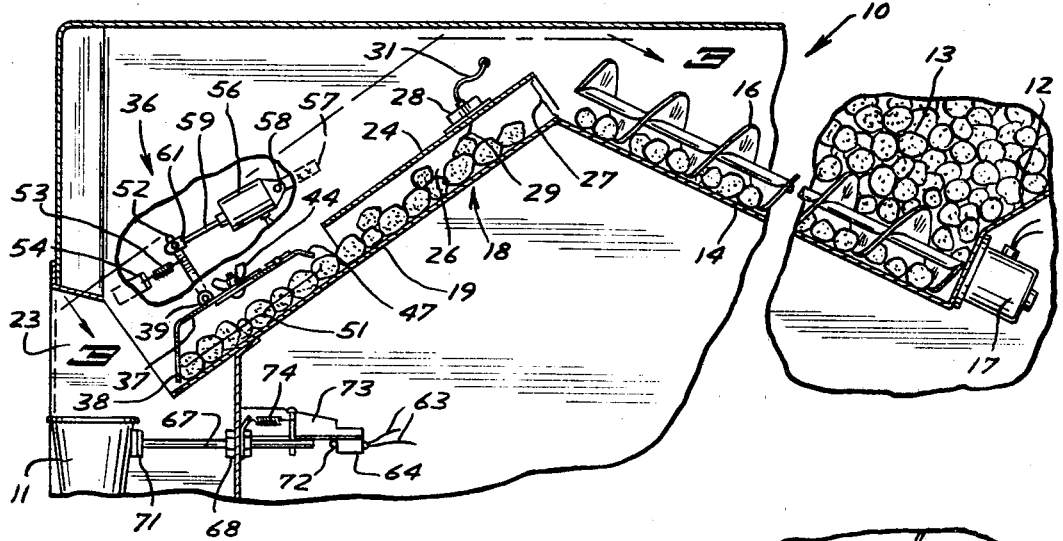
FIGURE 1 is a foreshortened sectional view of the dispensing assembly and material feeding auger of the invention.

Referring to the drawings there is shown in FIGURE 1, a material dispensing machine indicated generally at 10 operable to deposit a charge of material 13, as ice cubes, into a container 11, as a glass, cup or the like. Machine 10 has a storage hopper 12 carrying a quantity of particulate material 13, as ice cubes or the like. The machine is hereinafter described as an ice cube dispenser. However, the utility of the machine is not restricted to a particular material as any flowable particulate material can be dispensed. The material may be particulate, granular of block-like in form as sand, grain, coal, crushed ice, ice cubes and the like.

The bottom of the hopper 12 has an upwardly inclined trough 14 accommodating a conveyor or auger 16 driven by an electric motor 17. On operation of the motor 17, the auger 16 rotates moving a supply of ice cubes upwardly along the trough 14 into a discharge trough indicated generally at 18. The discharge trough 18 extends downwardly and outwardly and terminates in a material receiving compartment 23 open to the outside of the machine. As shown in FIGURE 3, trough 18 has a generally flat upwardly inclined linear base 19 and upright side walls 21 and 22 forming a generally U-shaped cross section passageway for the movement of ice cubes into the cube receiving compartment. Returning to FIGURES 1 and 2, flat longitudinally disposed cover or housing 24 is secured to the sidewalls 21 and 22 at the upper end of the trough to form a tunnel-like passageway 26. The upper or top end 27 of the passageway is open adjacent the jointing or apex portion of the troughs 14 and 18 so that ice cubes moved by the auger 16 slides into the tunnel passageway 26.

Secured to the top of cover 24 is a normally open or ON switch 28 having an actuator 29 projected through the cover 24 into the top area of the tunnel passageway 26. As shown in FIGURE 5, lines 31 connect the switch 28 to relay 32 interposed in lines 33 connecting a source of electric power to the motor 17. Line 33 has a master switch 34 controlling the operation of the motor 17. The function of switch 28 is to sense the quantity or amount of ice cubes 13 in tunnel-like passageway 26. When the passageway is empty or partially full of ice cubes the actuator 29 will move to its normal position extended into the passageway turning the switch 28 ON.

When switch 28 is ON the relay 32 is energized thereby closing the circuit for the motor 17. Motor 17 operates to rotate the auger 16 to transport ice cubes up trough 14 and into the open top end 27 of passageway 26. The ice cubes 13 slide down the inclined passageway 18 into engagement with a normally closed gate unit indicated generally at 36. Continued operation of the auger feeds a continuous supply of ice cubes into the tunnel-like passageway 26. Eventually, the passageway 26 fills with ice cubes and engages the actuator 29. The ice cubes move the switch actuator 29 up toward cover 24 turning switch 28 OFF de-energizing relay 32 stopping the motor 17. In this manner, the switch 28 automatically functions with the motor 17 to provide the passageway 26 with a continuous supply of ice cubes.

Figure 2:
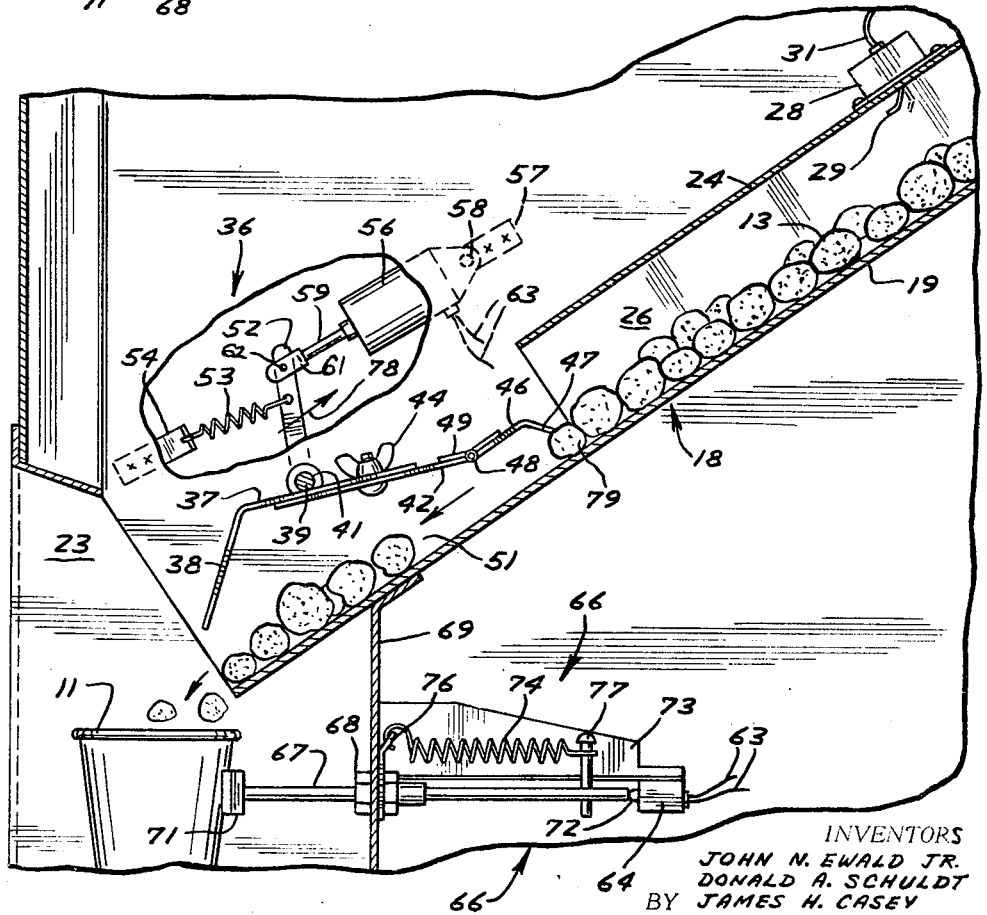
FIGURE 2 is an enlarged sectional view of the dispensing assembly shown in FIGURE 1.

The gate unit 36 is a metering and dispensing device operable to hold a charge of ice cubes in the lower end of the trough 18 and to discharge the ice cubes into the container 11. The gate unit 36 is movable from a first hold position shown in FIGURE 1 to a second discharge position shown in FIGURE 2 to dispense a quantity of ice cubes. Gate unit 36 comprises a movable plate 37 longitudinally located in the trough above the base 19. The forward portion plate 37 has a downwardly projected nose 38 normally located close to the base 19 to act as a door to hold the ice cubes under the plate 37. Secured to the top of plate 37 is a transverse rod 39. A bearing 41 rotatably mounts the rod 39 on the sidewall 21 of the trough so that the plate 37 rotates about a generally transverse axis moving the nose 38 toward and away from the base on 19. Adjustably secured to the rear portion of plate 37 is a flat member 42 which forms a rearward extension for the plate to vary the charge of ice cubes which are dispensed. Plate 37 and member 42 have longitudinal slots 43 which receive a thumb nut and bolt assembly 44 used to adjustably connect the member 42 to the plate 37. Hingedly secured to the forward portion of member 42 is a stop plate 46 having a downwardly turned leg 47. A transverse hinge 48 connects the adjacent portions of plate 46 and member 42. Included in the hinge 48 is a spring 49 operable to bias the plate 46 in linear alignment with member 42 as shown in FIGURE 1. The plate 37 along with the member 42 form a cover for an ice cube charge chamber or space 51 which can be increased or decreased by the adjusting of the position of member 42 on the top plate 37. As shown in FIGURE 2, when the gate unit 36 is moved to the open position, the leg 47 of the stop plate may engage an ice cube. The spring 49 provides the stop plate with yielding characteristics so that the forward nose 38 will move to the open position alowing the ice cubes to slide out of trough 18 into the container 11.

As shown in FIGURES 2 and 3, the rod 39 projected outwardly from the bearing 41 is secured to an upright arm 52. A spring 53 connected to the arm 52 and a bracket 54 mounted on the side of the dispenser housing biases the arm 52 in a forward direction yieldably holding the gate in the closed position. Positioned above the member 42 is a control solenoid 56 pivotally mounted by pin 58 to a bracket 57 secured to trough side wall 21. Projected forwardly from solenoid 56 is a control rod 59 secured to a clevis 61. A pin 62 pivotally connects the clevis with the upper end of the arm 52.

The control circuit for the solenoid 56, shown in FIGURES 2 and 4, includes lines 63 connected to an on-off switch 64 forming part of a pressure responsive actuator indicated generally at 66. Pressure responsive actuator comprises lineally movable control rod 67 slidably mounted in a sleeve 68 secured to an upright wall 69 of the dispensing machine housing. Wall 69 is the back wall of the material receiving compartment 23. Secured to the forward end of rod 67 is an arcuate shaped bumper 71 adapted to be engaged by the container 11. Bumper 71 functions to position the container 11 under the discharge opening of the trough 18. The opposite or rear end of rod 67 is in alignment with an actuator or button 72 of switch 64 so that when the rod is moved to an "in" position the switch 64 will be turned ON thereby energizing the solenoid 56 to effect the dumping of the ice cubes into the container. A spring 74 functions to return the rod 67 to the "out" position on release of the pressure applied by the container 11 on bumper 71. One end of the spring 74 is attached to a clip 76 secured to the housing wall 69 by a nut used to attach the sleeve 68 to the wall. The opposite end of the spring hooks around an upright pin 77 secured to a forward portion of rod 67.

In use, a container 11 is placed in the material receiving compartment 23 in engagement with the bumper 71. This places the open end of the container immediately below the discharge end of trough 18 so that the ice cubes in the charge chamber 51 on opening of gate unit 36 will fall into the container. The dispensing operation is commenced by pushing the container to the "in" position moving the rod 67 into engagement with the switch actuator 72 to turn switch 64 ON. This completes the circuit for the solenoid 56 which pulls the rod 59 in the direction of the arrows 78, shown in FIGURE 2, pivoting the gate plate 37 and holding nose 38 to the up or open position whereby the ice cubes in charging chamber 51 fall or slide out of the trough 18 into the container. If the stop leg 47 engages an ice cube, as shown by ice cube 79 in FIGURE 2, the hinge 48 and spring 49 allows the gate plate 37 to continue to pivot articulating hinge 48. The amount of charge or number of ice cubes that are stored in the charge chamber 51 may be varied by adjusting the length of the space between the nose 38 and rear leg 47. This is accomplished by releasing the nut of the nut and bolt assembly 44 and sliding the member 42 to a new position.

When the container 11 is removed from the compartment 23 spring 74 returns the control rod 67 to the "out" position away from switch 64 thereby opening the circuit to the solenoid 56. Spring 53 pulls the arm 52 in the forward direction, closing the gate 36. The ice cubes located in the tunnel passage way 26 slide down under the leg 47 into the charging chamber 51. In this manner a charge of ice cubes is available at all times for depositing in a container.

When the ice in the tunnel passageway 26 slides down into the charge chamber 51 the switch 28 is turned to energize the relay 32 and thereby complete the circuit for the auger motor 17. On operation of motor 17 the auger 16 rotates to feed additional ice cubes into the top end 27 of the tunnel passageways 26. As the ice builds up in the passageway 26 it engages the switch actuator 29 moving the actuator to turn switch OFF, as shown in full lines in FIGURE 2, thereby opening the circuit to the motor 17. The auger intermittently operates through the use of the switch 28 to provide the passageway 26 with a continuous supply of ice cubes which are available for movement into the charging chamber under the gate plate 37.

While there have been shown and described a preferred embodiment of the invention, it is understood that various changes, additions and variations in the structures can be made by those skilled in the art without departing from the spirit of the invention. The invention is defined in the following claims:

The embodiments of the invention in which an exclusive property or privilege is claimed are defined as follows:

1. In an apparatus for dispensing material: a downwardly inclined member having a passageway for directing material to a discharge location, gate means located in the passageway movable to a first position to hold material in the passageway and movable from the first position to a second position to allow the material to fall from the passageway, means for moving the gate means from the first position to the second position, a housing enclosing a portion of the passageway above the gate means, auger means operable to move material into the upper end of the housing to supply the passageway with material, a motor operable to drive the auger means, and switch means having an actuator extended into and engageable with material in the passageway, said actuator movable to an "ON" position to energize the motor means when material has moved away from the actuator whereby the auger means feeds additional material in the passageway, said additional material engaging the actuator to move the actuator to an "OFF" position de-energizing the motor means.

2. The structure of claim 1 wherein said gate means has a plate having a body extended generally longitudinally of the passageway and a forward portion projected into the passageway, pivot means pivotally mounting the plate for movement about an axis generally transverse of the passageway.

3. The structure of claim 2 wherein said means for moving the gate means comprise a solenoid and an arm connecting the solenoid to the pivot means, said pivot means being secured to the body whereby operation of the solenoid moves the gate means from the first position to the second position.

4. The structure of claim 2 wherein said gate means includes a member attached to the plate and projected rearwardly from the plate, a rear material stop yieldably mounted on the member.

5. The structure of claim 4 including means adjustably mounting the member on the plate to change the amount of material discharged on movement of the gate means from the first position to the second position.

6. A metering device comprising: a downwardly inclined trough having upright side walls and a bottom wall forming a passageway for dispensable material, said trough having a discharge end, gate means located in the passageway above the bottom wall of the trough adjacent said discharge end and movable to a first position to hold material in the passageway and movable from a first position to a second position to allow the material to flow through the passageway, said gate means having a plate with a body spaced above the bottom wall extended generally longitudinal of the passageway with a forward portion projected toward the bottom wall of the trough, pivot means pivotally mounting the plate on the side walls for movement about an axis generally transverse to the passageway, solenoid means for moving the plate from the first position to a second position to allow material to flow through the passageway, and actuator means operable to energize the solenoid means, said actuator means having a movable member located adjacent the discharge end of the trough.

7. The structure of claim 6 wherein said gate means includes a member attached to the body and projected rearwardly therefrom, and a rear material stop leg yieldably mounted on the member and extended toward the bottom of the trough.

8. The structure of claim 7 including a releasable means for adjustably mounting the member on the plate to vary the distance between the forward portion on the plate and the rear material stop to thereby change the amount of material discharged from the trough on movement of the gate means from the first position to the second position.

9. In an apparatus for dispensing material: a downwardly inclined trough for storing a quantity of dispensable material, a housing enclosing an upper portion of the trough, auger means operable to move material into the upper end of the trough to supply the trough with a quantity of material, motor means operable to drive the auger means, switch means having an actuator extended into the enclosed portion of the trough and engageable with the material in the passageway, said actuator movable to an "ON" position to energize the motor means when material has moved away from the actuator whereby the auger means feeds additional material in the passageway, said additional material engaging the actuator to move the actuator to an "OFF" position de-energizing the motor means.

10. The structure of claim 9 wherein the auger means is located in an upwardly inclined trough joined to the upper end of the downwardly inclined trough, said housing enclosing the upper portion of the trough.

11. A metering device comprising: a trough having a bottom wall and side walls forming a passageway for dspensable material, gate means located in the passageway between the side walls and above the bottom wall of the trough, said gate means having a longitudinal member spaced above the bottom wall, a first member and a second member spaced from the first member attached to the longitudinal member to hold an amount of material in the passageway below the longitudinal member, means mounting the gate means on the side walls for movement from a first position wherein the first member holds material in the passageway and the second member allows material to move toward the first member to a second position wherein the first member allows the amount of material to move from the passageway and the second member prevents additional material from moving toward the first member.

12. The metering device of claim 11 wherein the first member has a portion projected toward the bottom of the trough and the second member has a portion projected toward the bottom of the trough.

13. The metering device of claim 12 including means pivotally connecting the longitudinal member with the second member.

14. The metering device of claim 11 wherein the means mounting the gate means comprise pivot means pivotally mounting the gate means on the side walls for movement generally transverse to said passageway.

References Cited

UNITED STATES PATENTS

| | | | |
|---|---|---|---|
| 2,233,466 | 3/1941 | Ayers | 221—298 X |
| 3,096,908 | 7/1963 | Parker et al. | 221—298 X |

STANLEY TOLLBERG, Primary Examiner

U.S. Cl. X.R.

221—301